United States Patent [19]

Johnson

[11] Patent Number: 4,712,949
[45] Date of Patent: Dec. 15, 1987

[54] ON-EDGE END-MILLING INSERT

[75] Inventor: William B. Johnson, Rockford, Ill.

[73] Assignee: Ingersoll Cutting Tool Company, Rockford, Ill.

[21] Appl. No.: 10,761

[22] Filed: Feb. 4, 1987

Related U.S. Application Data

[63] Continuation-in-part of Ser. No. 842,460, Mar. 21, 1986, abandoned.

[51] Int. Cl.⁴ ............................................. B26D 1/00
[52] U.S. Cl. ........................................ 407/42; 407/48; 407/54; 407/62; 407/120
[58] Field of Search ................ 407/34, 41, 42, 48, 407/53, 54, 62, 113, 114, 120; 408/713

[56] References Cited

U.S. PATENT DOCUMENTS

| | | | |
|---|---|---|---|
| 3,662,444 | 5/1972 | Erkfritz | 407/41 |
| 4,182,587 | 1/1980 | Striegl | 407/113 |
| 4,411,564 | 10/1983 | Johnson | 407/113 |
| 4,566,827 | 1/1986 | Neumueller | 407/42 |
| 4,681,485 | 7/1987 | Koelewijn | 407/42 |

Primary Examiner—Frederick R. Schmidt
Assistant Examiner—William E. Terrell
Attorney, Agent, or Firm—Fitch, Even, Tabin & Flannery

[57] ABSTRACT

A replaceable on-edge cutting insert is especially adapted for use in end-milling cutters of small diameter, viz., in the size range down to one-half inch in diameter, and with cutting geometry which positions the rake face of the insert in the cutter body with substantially neutral radial rake and positive axial rake. A modified form having a cylindrical primary clearance land is used in the tip cutting positions of a ballnose end mill.

11 Claims, 28 Drawing Figures

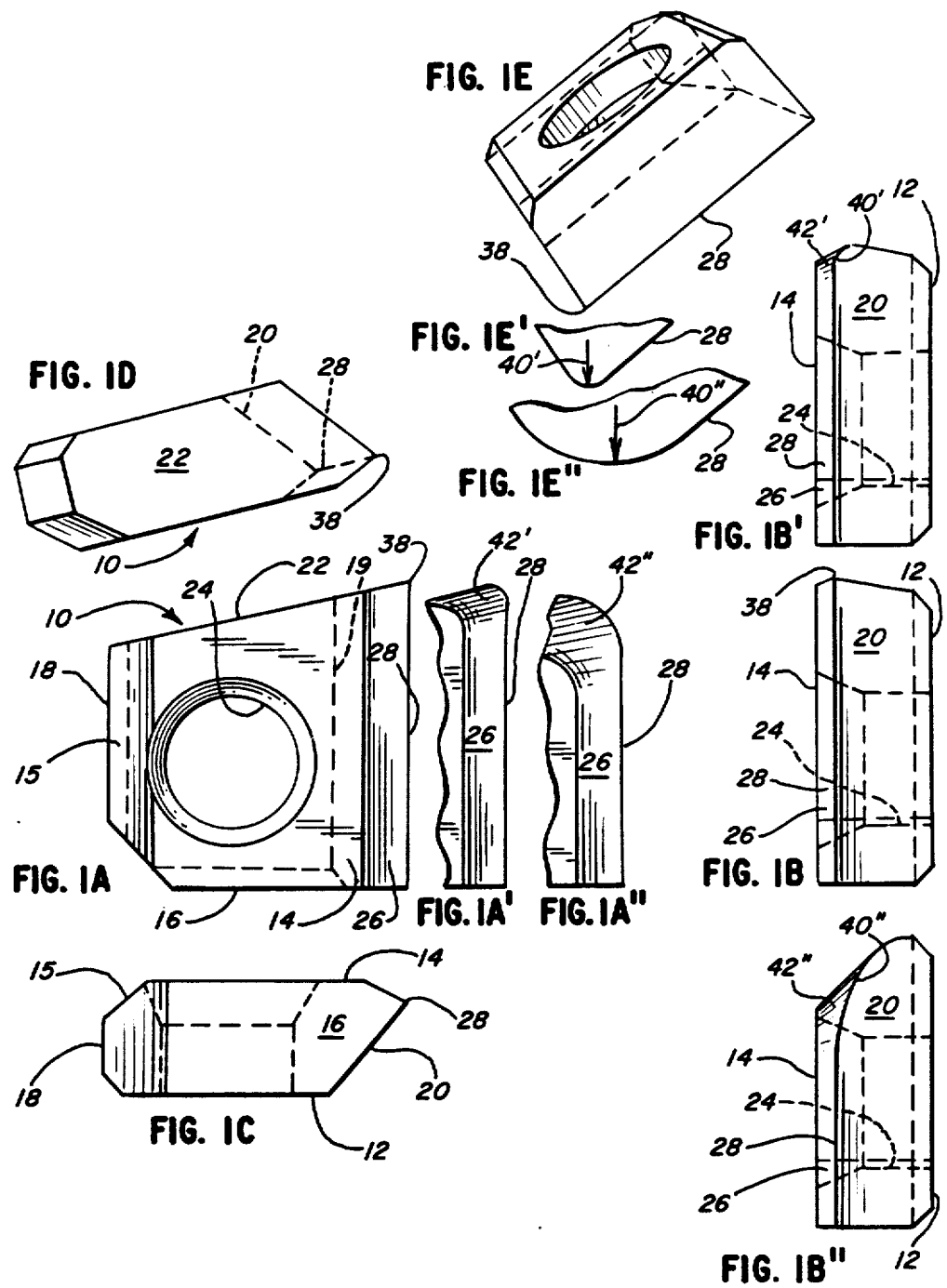

ON-EDGE END-MILLING INSERT

This application is a continuation-in-part application of Ser. No. 842,460, filed Mar. 21, 1986, abandoned.

This invention relates to milling cutters and particularly to on-edge cutting inserts for end mills of small diameter.

Although the benefits of replaceable on-edge inserts in milling cutters are widely appreciated, it has been difficult to extend those benefits to end-milling cutters of small diameter, which is to say, end mills having a diameter as small as one-half inch, while also maintaining desirable cutting geometry, namely, a neutral or substantially neutral radial rake and positive axial rake of the cutting edge of the insert.

That geometry is achieved in the end-milling on-edge insert of the present invention, which, in one of its aspects, has been employed successfully in end mills down to one-half inch in diameter, employing one or more cutting inserts of the invention in a given cutter body, depending on its size.

The cutting insert of the invention and the end-milling tool bodies in which it is employed are described in the following specification in conjunction with the accompanying drawings, in which:

FIGS. 1A, 1B, and 1C are orthographic projections of a straight-edged insert of the invention in frontal and side elevation, respectively, and from its underside;

FIG. 1D is a projection of the insert of FIG. 1A to a plane parallel to the top edge face of the insert; and FIG. 1E is a projection of the insert of FIGS. 1A and 1D to a plane perpendicular to the primary clearance face of the insert;

FIGS. 1A' and 1A" are fragmentary elevational views corresponding to FIG. 1A, but showing the straight-edged form of the insert modified by the provision of small and larger radii at the top of the cutting edge of the insert, in lieu of the sharp corner shown in FIGS. 1A to 1E, inclusive;

FIGS. 1B' and 1B", 1E' and 1E" similarly "echo" FIGS. 1B and 1E to show the radiused forms of the insert;

FIGS. 2A and 2B, 3A and 3B, 4A and 4B, and 5A and 5B, are respectively elevational and axial views of the straight-edged form of insert of the invention employed singly in the smallest cutter, and as multiple, equispaced inserts in combinations of two, three, and four inserts in cutters of larger size;

FIGS. 6A and 6B are, respectively, an enlarged fragmentary elevational view and an enlarged axial view of the cutter body of FIG. 5 with two of the four inserts removed to show the insert pockets in the cutter body;

FIGS. 7A, 7B, and 7C are orthographic projections of the insert of the invention modified for use in a ballnose end mill, illustrating the same in frontal and side elevation, respectively, and from its underside;

Figures 2A, 3A, 4A, 5A:
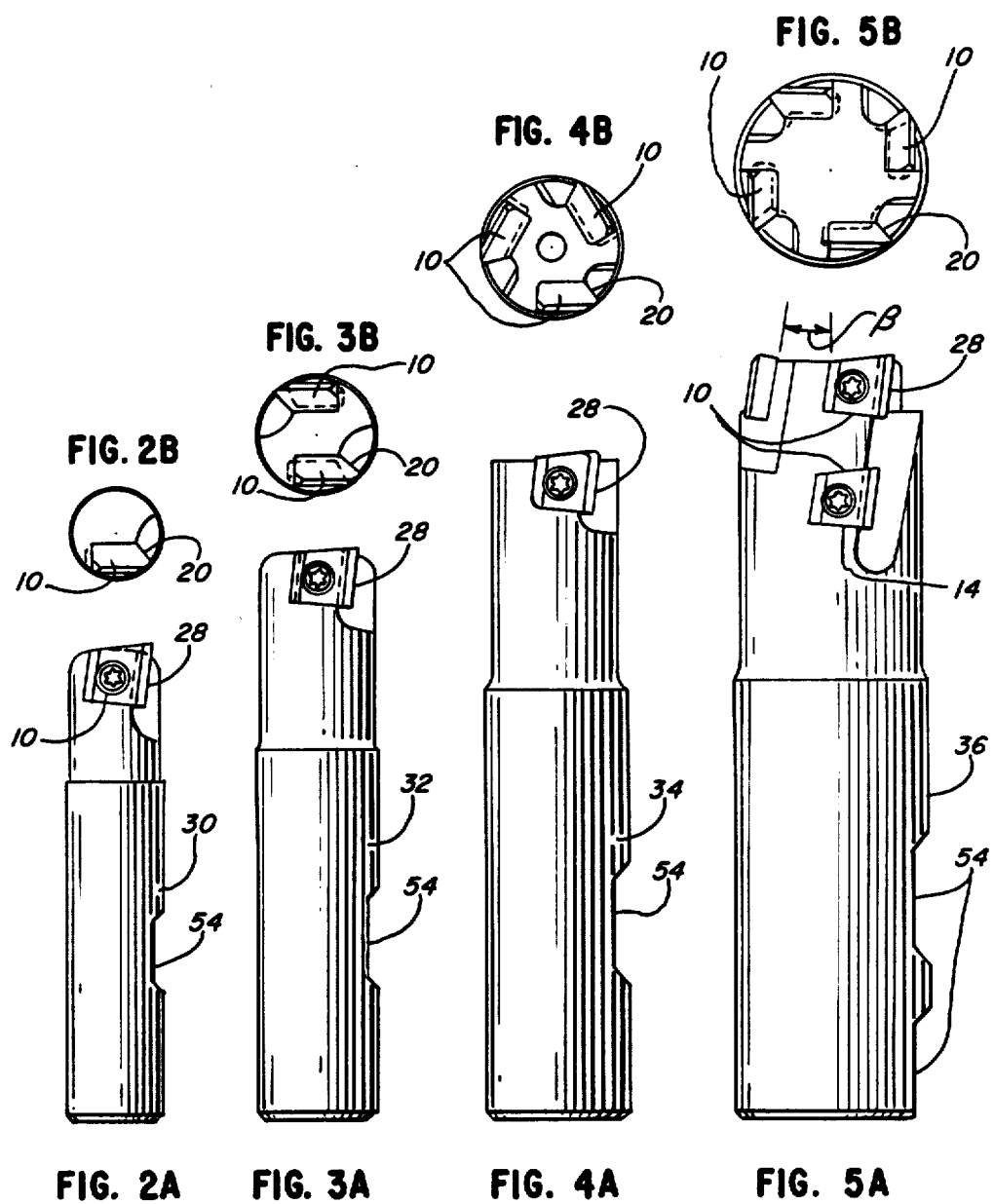

Referring to FIGS. 1A to 1C of the drawings for a detailed explanation of the straight cutting edge form of insert in accordance with the invention, it may be seen that the insert 10 is essentially a flat block of cutting material, such as tungsten carbide for example, having two parallel major faces 12 and 14 bounded by four edge surfaces 16, 18, 20 and 22 of varying configuration which adapt the insert of the invention for end-mill use in the minor cutter sizes indicated. Because of the geometry necessary to adapt an on-edge cutting insert to the small swing radius of the least cutter, the insert is a single-position insert with no indexability.

Of the two parallel major faces 12 and 14 of the insert, the face 12 constitutes the seating surface of the insert, while the surface 14 constitutes the radially-outward-facing clearance face of the insert. A cored hole 24, extending between the major faces 12 and 14 is countersunk only from the major face 14, and receives a countersink-head retaining screw (not shown) to secure the insert in a pocket milled in the cutter body.

Two edge surfaces 16 and 18 of the insert are respectively axial and circumferential locator surfaces which, together with the seating surface 12, determine the orientation of the cutting edge of the insert when installed in its receiving pocket of the cutter body. The locator edge surfaces 16 and 18 are perpendicular to each other and perpendicular as well to the seating surface 12, while the corners at which the planes of the edge locator surfaces intersect each other and the plane of the seating surface of the insert are chamfered for clearance from the radii at the intersections of the corresponding receiving surfaces of the insert pocket or pockets milled in the cutter body.

The edge surface 20 of the insert which is opposite the circumferential locator surface 18 is disposed at an obtuse angle, of the order of 130°, to the seating surface 12 of the insert, intersecting the surface 12 in a line parallel to the opposite and circumferential locator edge surface 18, the diagonal edge surface 20 constituting the rake face of the insert. At the intersection of the rake face 20 with the major clearance face 14 extended, the insert is provided with a primary clearance land 26 which intersects the rake face 20 to provide the major portion of cutting edge 28 of the insert, i.e., that which is oriented generally axially of the tool body. The primary clearance land 26 serves to strengthen the cutting edge 28 by reducing the sharpness of the cutting edge, while the opposite or trailing edge of the major clearance surface 14 is heavily chamfered, as at 15, to provide clearance from the work surface when the insert 10 used in the cutter body of the least diameter (FIGS. 2A and 2B).

The edge surface 22 of the insert opposite the axial locator surface 16 is essentially a plane surface which is perpendicular to the two major surfaces 12 and 14 of the insert, but disposed at an obtuse angle to the rear or circumferential locator surface 18 in order to provide axial clearance behind the generally radially disposed portion of the cutting edge 28. The intersection of the edge surface 22 with the major seating surface 12 of the insert is likewise chamfered to permit the insert to be used in other than an open-ended insert pocket at the tip of the cutter, e.g., in an axially remote position in axial extension of the cutting path of the tip cutters (see FIG. 5A), at which position clearance from the pocket-corner radius is equally desirable on all edge surfaces other than the rake face 20.

The orientation of the insert 10 within the several cutter bodies 30, 32, 34 and 36, from the single insert of the least cutter to the four equispaced inserts of the larger cutter bodies, is best appreciated by comparison of the elevational views A and end views B of FIGS. 2, 3, 4, and 5.

There it will be noted that the insert is rotated about the axis of the securing-screw hole to position the cutting edge at an angle α (FIG. 6A) of approximately 6° out of parallel with the axis of the cutter when viewed perpendicularly to the major clearance face 14 of the cutter, in order to provide positive axial rake to the cutting edge 28. However, in order to maintain the extremities of the axial portion of the cutting edge 28 at the same swing radius from the axis of the cutter, the seating surface of the insert must also be tipped out of parallel with the axis of the cutter by the amount of the angle β in a direction such that the plane of the seating surface 12 would intersect the axis of the cutter body if both were extended beyond the tip of the cutter. If, for convenience of manufacture, the angle α of rotation of the insert about the retainer-screw hole remains fixed for cutter bodies of all sizes, the angle β to which the seating surface of the insert must be tipped for this purpose, that angle being called the spotting angle, decreases with increasing swing radius of the cutter.

Figure 6B:
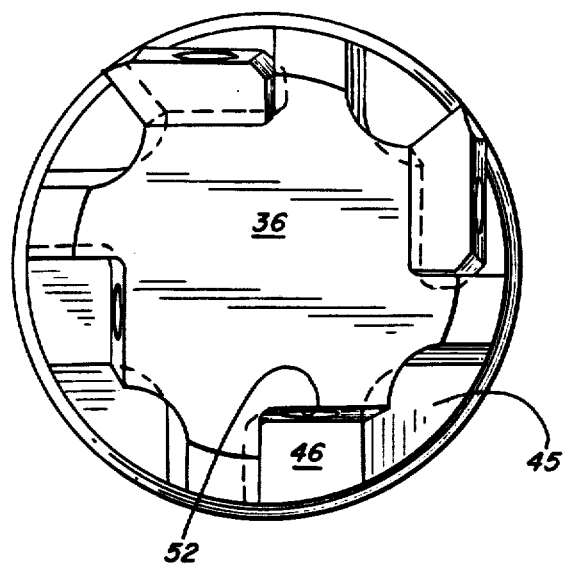
Figure 6A:
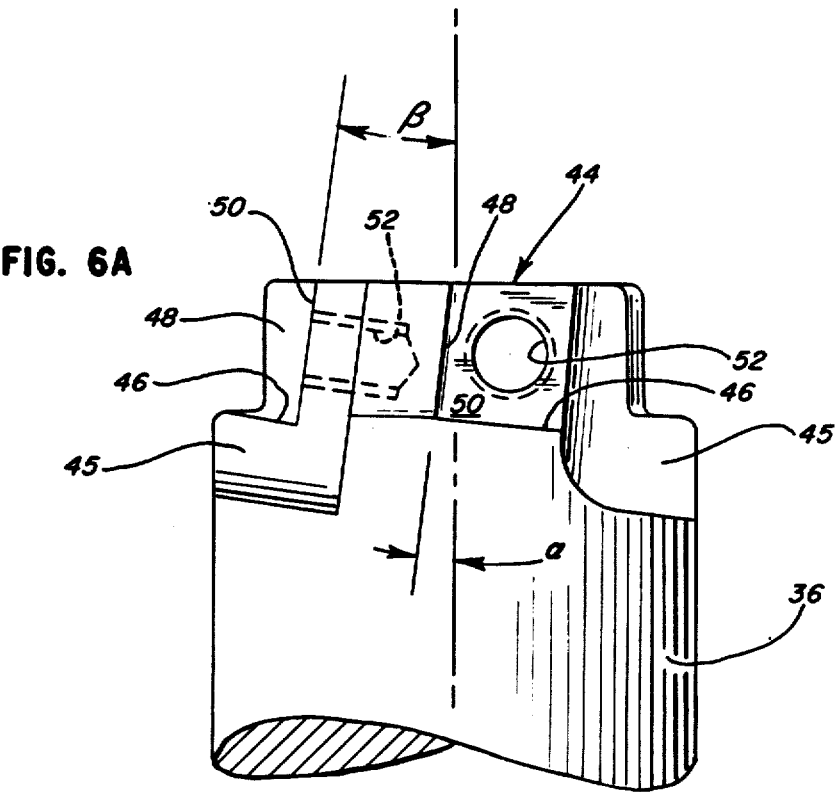

From the enlargements of FIGS. 6A and 6B, which correspond generally to FIGS. 5A and 5B with two of the cutting inserts removed, it may be seen that the insert pockets 44 are open at the end of the tool shank to permit the cutting edges of the inserts to protrude beyond the tip of the tool, and each is preceded by a chip gullet 45 of generally conforming orientation.

The 6° tilt or rotation of the insert about the axis of the retainer screw hole is reflected in the orientation of the edge locator surfaces 46 and 48 of the pocket, these being respectively perpendicular to each other and to the seating surface 50 of the insert pocket, from which the tapped hole 52 for the insert retaining screw proceeds into the body of the tool.

The axis of the screw hole is preferably tilted at a slight angle to the seating surface 50 of the pocket in the direction of the corner between the two edge locator surfaces 46 and 48 of the pocket, in accordance with the principles of the Erkfritz U.S. Pat. No. 3,662,444, i.e., so that the tightening of the retaining screw exerts a lateral force in the direction of the pocket corner to urge the insert into intimate engagement with the edge locator surfaces 46 and 48 as well as with the seating surface 50 of the pocket when the screw is tightened.

The tilt of the main seating surface 50 of the pocket with respect to the rotational axis of the tool body, i.e., the angle β, is plainly seen in FIG. 6A, that angle, as earlier explained, being necessary in conjunction with the axial rake angle α, to maintain the axially aligned portion of the cutting edge 28 at a substantially uniform swing radius so that the cut surfaces of the workpiece are perpendicular, i.e., that the cutting path swept by the cutting edge is as nearly cylindrical as possible rather than tapering conically in either direction.

Not seen in foreshortened FIG. 6A, but plain from FIGS. 2A, 3A, 4A and 5A, each tool shank is provided with one or more driving flats 54 by means of which the tool is retained in and driven by a tool holder, not shown.

Returning now to FIG. 1, it will be seen that the insert of the invention may be provided with a sharp corner 38 at the intersection of the radially and axially oriented portions of the cutting edge 28 for special purpose application, but, for general end-milling use, the cutting edge may be provided with a radius where its radial and axial portions meet. Such radius is preferably provided by form grinding an outwardly convex cylindrical surface tangent to the primary clearance land 26 at whatever radius is suitable to the application, two such alternate radii 40' and 40" being illustrated respectively in FIGS. 1E' and 1E". The resulting alternate cylindrical surfaces 42' or 42" of FIGS. 1A' and 1A" which are thus imposed upon the insert provide the desired radius 40' or 40" at the junction of the axial and radial portions of the cutting edge 28, while the cylindrical surface 42' or 42" provides the necessary primary clearance behind the rounded portion of the cutting edge 28 as an extension of the primary land 26.

As shown in FIGS. 1A' and 1A", the area of the cylindrical clearance surface 42' or 42" decreases as the surface recedes from the rounded cutting edge, that configuration resulting from the fact that, in the radiused configuration, the cylindrical surface 42' or 42" is tangent to the primary clearance land 26 rather than to the major clearance face 14. The employment of a convex cylindrical or conical surfaces for such purpose is disclosed in my prior U.S. Pat. No. 4,411,564.

It will be noted in FIGS. 2B and 3B that because of space constraints imposed by the smaller swing radii of the lesser diameter tool shanks 30 and 32, the rake face 20, and the radial portion of the cutting edge 28, are disposed at slightly negative radial rake whereas the greater design freedom of the larger tool shanks 34 and 36 permits the placement of the inserts with precisely neutral radial rake. Experience has shown that slight negative deviation of the smaller cutters from precise radial alignment is acceptable from a performance standpoint even with the sharp cornered insert, and very satisfactory with rounded corner inserts, all being nearly or substantially radially neutral.

Figure 7E:
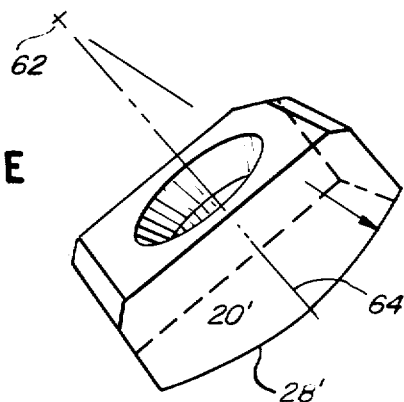
FIG. 7E is a projection to a plane perpendicular to the primary clearance face of the insert.
Figure 7D:
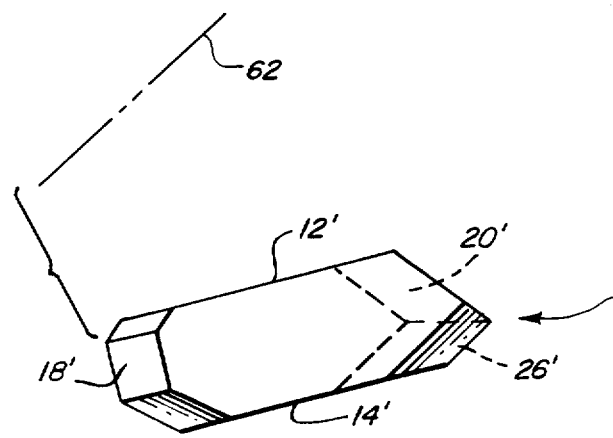
FIG. 7D is a projection of the insert to a plane parallel to the top edge face of the insert of FIG. 7A.
Figure 7A:
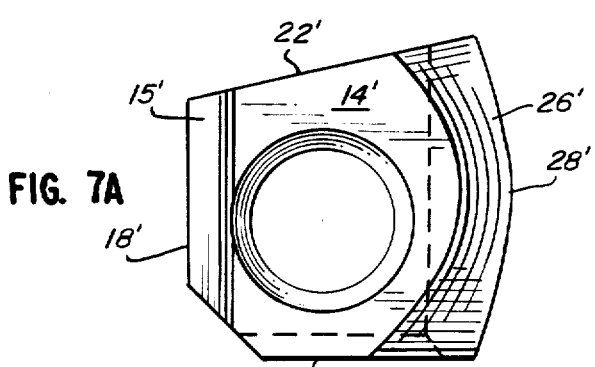
Figure 7B:
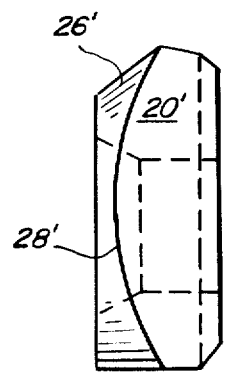
Figure 7C:
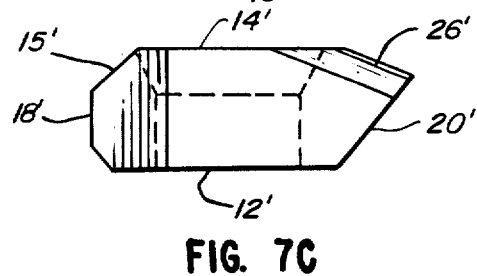

In the further modification of the improved insert of this invention for service as a ball nose insert illustrated in FIGS. 7A to 7E, inclusive, the primary clearance face 26', instead of being planar like the primary clearance face 26 of the insert of FIGS. 1A to 1E, inclusive, is cylindrical about an axis 62 which deviates slightly from perpendicularity to the rake face 20' of the insert to provide an acute angle between the rake face 20' and the primary clearance face 26' of approximately the magnitude of the acute angle between corresponding faces 20 and 26 of the insert of FIG. 1. In FIG. 7E, the axis 62 of the cylindrical surface 26' is seen in point projection, and its projection 64 to the rake face 20' approximately bisects that surface.

All plane surfaces of the modified insert 60 of FIGS. 7A through 7E, inclusive, viz., the seating surface 12', the opposed secondary clearance surface 14', the edge seating surfaces 16' and 18', the clearance chamfer 15', the rake face 20', and the edge clearance face 22', bear the same geometric relation to each other as do the like numbered surfaces of FIGS. 1A to 1E, inclusive, the essential difference between the two forms being the cylindrically-curved primary clearance face 26' and essentially circular cutting edge 28' of FIG. 7, as distinguished from the planar primary clearance face 26 and straight cutting edge 28 of FIG. 1.

Figure 8B:
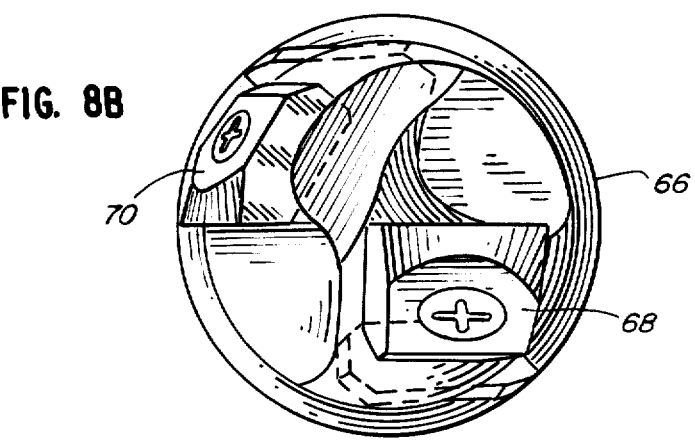
FIGS. 8A and 8B are, respectively, elevational and axial views of the inserts of FIGS. 7A to 7E, inclusive, employed as the hemispherically-cutting lead inserts of a ballnose end mill, with the insert of FIGS. 1A to 1E, inclusive, positioned along the shank of the tool to make a cylindrical cut tangent to the hemispherical cut of the ball nose.
Figure 8A:
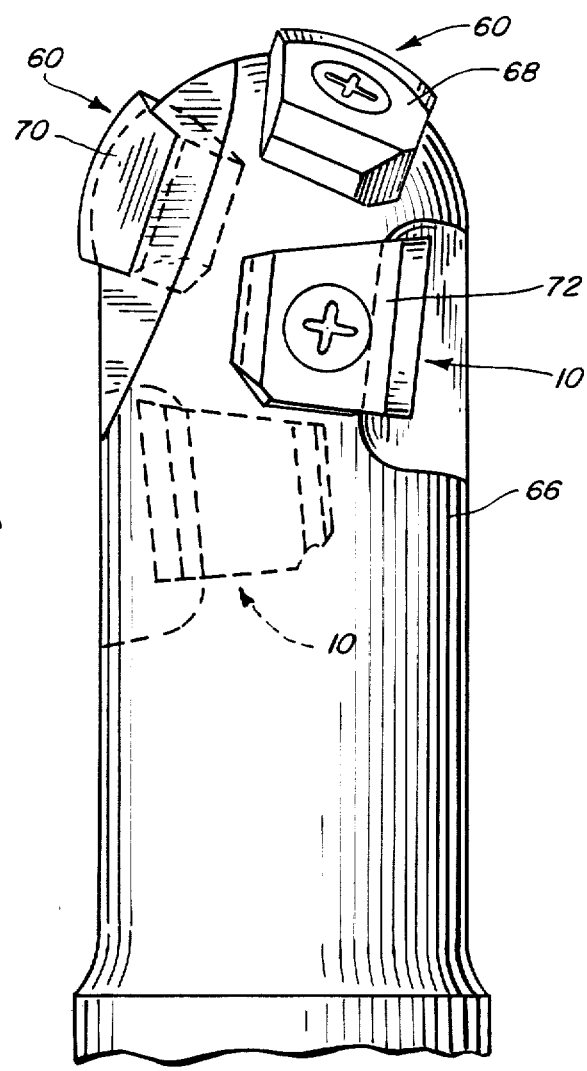

The ballnose insert 60 of FIG. 7 is shown in use position in a ballnose end mill 66 in FIG. 8. One of the curved-edge inserts 60 is positioned as the lead or point insert 68 of the tool, in which position its curved cutting edge 28' describes a cutting path from the tool axis through approximately one-half of the semi-circular quadrant, while a second curved-edge insert 60 is positioned as the following insert 70 on the opposite side of the tool axis to cover the balance of the quadrant with a slight overlap between the cutting paths of the two curved-edge inserts 68 and 70.

Similarly, the cutting path of the latter at its maximum radius overlaps slightly, its point of tangency with the cutting path of the first insert 72 of one or more straight-edged auxiliary inserts 10 positioned with positive axial rake along the shank of the tool. The cutting paths of such auxiliary inserts employed along the shank of the tool likewise overlap to provide a continuous cutting edge from the axial point of the ballnose end mill through the circular quadrant of the cutting path shared by the two nose cutters, and then tangent to the quadrant in a straight line parallel to the axis of the shank of the tool to the depth of the number of straight-edge inserts provided, two in the illustrated case.

With the cutting insert here disclosed, the benefits of on-edge cutting inserts, namely, the increased durability and rigidity of the cutting edge of the insert, even at markedly higher cutting speeds, have been successfully applied for the first time, so far as is known, to end-milling cutters of minor diameter, i.e., in the size range down to one-half inch. The essential characteristics of my novel inserts and of the cutters made possible are set forth in the accompanying claims.

What is claimed is:

1. An on-edge cutting insert for end mills or the like comprising an essentially flat block of cutting material having
    two opposed major surfaces at least one of which is a plane surface constituting a major locating surface upon which the insert is seated in a tool body while the other major surface provides a radially outward facing secondary clearance surface when the insert is so seated,
    a plane minor boundary edge face disposed at an obtuse angle to said major locating surface and constituting the rake face of the insert,
    an opposite, plane, minor boundary edge face perpendicular to the major locating surface and constituting a first locating edge surface,
    an adjoining minor boundary edge face disposed perpendicularly to said major locating surface and to said opposite minor boundary edge face and constituting a second locating edge surface,
    a fourth minor boundary edge face opposed to said second locating edge surface and disposed at an obtuse angle to said opposite minor boundary edge face and intersecting said rake face at an acute angle, and
    a primary clearance face extending along an edge of said secondary clearance face adjacent to said rake face and intersecting the rake face to define a cutting edge with an acute included angle larger than the included angle between said rake and secondary clearance faces extended,
    said block having a hole passing between said major surfaces to receive a fastener for securing the insert to a tool body, said hole being countersunk at said other major surface.

2. The insert of claim 1 wherein said primary clearance face is a plane land and the cutting edge formed by its intersection with the rake face is a straight line parallel to the plane of said locating surface.

3. The insert of claim 2 wherein said cutting edge terminates in a fillet-cutting curve formed by a convex cylindrical surface tangent to said primary clearance face at its juncture with said fourth boundary edge surface.

4. The insert of claim 2 wherein said cutting edge is parallel to said first locating edge surface.

5. The insert of claim 2 wherein said fourth minor boundary edge surface is planar and perpendicular to said major locating surface.

6. The insert of claim 5 wherein the intersection of said clearance face and said first locating edge surface is relieved to clear the cutting path of said cutting edge when swung on small radii.

7. The insert of claim 2 wherein each pair of said mutually perpendicular locating surfaces are separated by a chamfer.

8. An end mill comprising a tool shank having provision at one end for gripping the shank in a tool holder and having at the other end at least one axially-open peripheral insert pocket containing an on-edge cutting insert in accordance with claim 2,
    said insert pocket having a radially outward facing plane seating surface disposed to receive said major seating surface of the insert and a pair of mutually perpendicular locator surfaces each perpendicular to said seating surface to receive said first and second edge locating surfaces of said insert,
    a chip gullet adjacent to said pocket in the cutting direction of rotation of said shank,
    said seating and edge locator surfaces of said pocket being tipped to position said rake face with substantially neutral radial rake and positive axial rake while positioning said fourth minor boundary edge face of the insert as the axially facing clearance face of the insert.

9. The insert of claim 1 wherein said primary clearance face is a convex surface and the cutting edge formed by the intersection of said primary clearance face with said rake face is a substantially circular arc.

10. The insert of claim 9 wherein said convex surface is cylindrical.

11. A ballnose end mill comprising a ball nose tool shank having provision at its remote end for gripping the shank in a tool holder and having at its ballnose end a pair of axially open insert pockets each containing an on-edge cutting insert in accordance with of claim 9,
    each said pocket having a plane seating surface disposed to receive said major seating surface of the insert and a pair of mutually perpendicular locator surfaces each perpendicular to said seating surface to receive said first and second edge locating surfaces of said insert,
    the position and the inclination of said seating and locator surfaces of said one pocket being such as to position the rake face of the insert therein substantially radially of the shank with its substantially circular cutting edge extending from the axis of the tool along the quadrant of the cutting path,
    the position and the inclination of the seating and locator surfaces of the other of said pockets being such as to position the rake face of the insert therein substantially radially of the shank on the opposite side of the axis with its substantially circular cutting edge completing the quadrant of said cutting path to its point of maximum radius,
    said shank having a chip gullet adjacent to each pocket in the cutting direction of rotation of the shank.

* * * * *

UNITED STATES PATENT AND TRADEMARK OFFICE
CERTIFICATE OF CORRECTION

PATENT NO. : 4,712,949

DATED : December 15, 1987

INVENTOR(S) : William B. Johnson

It is certified that error appears in the above-identified patent and that said Letters Patent is hereby corrected as shown below:

Column 6, line 46, after "with" delete "of".

Signed and Sealed this

Twenty-eighth Day of June, 1988

Attest:

DONALD J. QUIGG

*Attesting Officer*    *Commissioner of Patents and Trademarks*